(12) United States Patent
Dubinsky et al.

(10) Patent No.: US 7,813,219 B2
(45) Date of Patent: Oct. 12, 2010

(54) ELECTRO-MAGNETIC ACOUSTIC MEASUREMENTS COMBINED WITH ACOUSTIC WAVE ANALYSIS

(75) Inventors: Vladimir Dubinsky, Houston, TX (US); Vitaly N. Dorovsky, Novosibirsky (RU); Xiao Ming Tang, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 67 days.

(21) Appl. No.: 11/605,912

(22) Filed: Nov. 29, 2006

(65) Prior Publication Data

US 2008/0125974 A1    May 29, 2008

(51) Int. Cl.
*G01V 1/30* (2006.01)
*E21B 49/00* (2006.01)

(52) U.S. Cl. .................. 367/31; 367/86; 73/152.05; 73/152.06; 73/152.08

(58) Field of Classification Search .................. 367/25, 367/31, 86; 702/11, 12, 13; 73/152.2, 152.05, 73/152.06, 152.08, 152.52; 324/324, 354
See application file for complete search history.

(56) References Cited

U.S. PATENT DOCUMENTS

| | | | | |
|---|---|---|---|---|
| 2,814,017 | A * | 11/1957 | Doll ............................. | 367/86 |
| 3,599,085 | A * | 8/1971 | Semmelink .................. | 367/86 |
| 4,904,942 | A * | 2/1990 | Thompson ................... | 324/323 |
| 5,417,104 | A * | 5/1995 | Wong ............................ | 73/38 |
| 5,963,037 | A | 10/1999 | Brady et al. | |
| 6,061,634 | A | 5/2000 | Belani et al. | |
| 6,140,817 | A | 10/2000 | Flaum et al. | |
| 6,476,608 | B1 * | 11/2002 | Dong .......................... | 324/323 |
| 6,541,975 | B2 | 4/2003 | Strack | |
| 6,842,697 | B1 * | 1/2005 | Millar et al. .................... | 702/2 |
| 6,978,672 | B1 | 12/2005 | Chen et al. | |
| 7,042,801 | B1 | 5/2006 | Berg | |
| 7,567,084 | B2 | 7/2009 | Eidesmo et al. | |
| 2007/0150200 | A1 * | 6/2007 | Charara et al. ................. | 702/6 |

OTHER PUBLICATIONS

Blokhin et al., Mathematic Modeling in the Theory of Multivelocity Continuum, 1995, Nova Science Publishers, Inc., New York.
Dorovsky et al., Godunov's Scheme for the Analysis of the Nonlinear Wave Process in the Two-Velocity Media With Elastic Interaction, 1994, pp. 355-366, The American Society of Mechanical Engineers, ASME, Fed. 196, No. 9, New York.
Tang et al., Dynamic permeability and borehole Stoneley waves: A simplified Biot-Rosembaum model, J. Acoust. Soc. Am., 90(3), Sep. 1991, pp. 1632-1646.

(Continued)

*Primary Examiner*—Ian J Lobo
(74) *Attorney, Agent, or Firm*—Bracewell & Giuliani LLP

(57) ABSTRACT

A method and apparatus for assessing the permeability of a subterranean formation and the hydrocarbon and/or water content of the formation. The method includes emitting an acoustic signal, such as a Stoneley wave into the formation and sending an electro-magnetic pulse into the formation. An analysis of the response of the Stoneley wave in conjunction with an analysis of a measurement of the electrical potential within the wellbore provides information pertinent to permeability and fluid composition.

11 Claims, 2 Drawing Sheets

OTHER PUBLICATIONS

Tang et al., Borehole Stoneley Wave Propagation Across Permeable Structures, Geophys. Prosp., Eur. Assn. Geosci. Eng., 1993, 41, pp. 165-187.

Singer et al., Electrokinetic Logging has the Potential to Measure Permeability, Petrophysics., vol. 47, No. 5, Oct. 2006, pp. 427-441.

Sergio Kostek, David Linton Johnson, Kenneth W. Winkler, & Brian E. Hornby, The Interaction of Tube Waves with Borehole Fractures, Part II: Analytical Models, Geophysics, vol. 63, No. 3 (May-Jun. 1998), p. 809-815.

Kenneth W. Winkler, Hsui-Lin Liu, & David Linton Johnson, Permeability and Borehole Stoneley Waves: Comparison Between Experiment and Theory, Geophysics, vol. 54, No. 1 (Jan. 1989), p. 66-75.

Andrew N. Norris, Stoneley-wave Attenuation and Dispersion in Permeable Formations, Geophysics, vol. 54, No. 3 (Mar. 1989), p. 330-341.

Oleg V. Mikhailov, John Queen & M. Nafi Toksoz, Using Borehole Electroseismic Measurements to Detect and Characterize Fractured (Permeable) Zones, Geophysics, vol. 65, No. 4 (Jul.-Aug. 2000), p. 1098-1112.

International Preliminary Report on Patentability and Written Opinion dated Jun. 3, 2009, 7 pages.

Zhu et al., Experimental Studies of Electrokinetic Conversions in Fluid-Saturated Borehole Models, Geophysics, Society of Exploration Geophysicists, Tulsa, OK vol. 65, No. 4, Jul. 1, 2000.

\* cited by examiner

ELECTRO-MAGNETIC ACOUSTIC MEASUREMENTS COMBINED WITH ACOUSTIC WAVE ANALYSIS

BACKGROUND OF THE INVENTION

1. Field of the Invention

The present disclosure relates to a device and a method for evaluating the characteristics of a subterranean formation. More specifically, the present disclosure relates to a device and method for evaluating the permeability of a hydrocarbon producing wellbore. Yet more specifically, the present disclosure concerns a device and method employing both acoustic and electro-magnetic transmission and receiving means for the evaluation of a subterranean formation.

2. Description of Related Art

Knowing certain characteristics of the subterranean formation surrounding a borehole, such as permeability, porosity, rugosity, skin factors, and other such properties can be used to estimate hydrocarbon-producing capability from these formations. Some of the more fundamental reservoir properties include permeability and relative permeability, along with porosity, fluid saturations, and formation pressure. Knowing these properties is also useful in evaluating the presence of water along with the presence of hydrocarbons.

With regard to subterranean formations, permeability is a measure of the ability to flow fluids through the material making up the formation, the material is typically rock or unconsolidated alluvial material. Permeability is generally measured in units of darcy, milli-darcy or md (1 darcy$\approx 10^{-12}$ m$^2$). Permeability represents the relationship between flow through a medium and physical properties of that fluid to a pressure differential experienced by the fluid when flowing through the medium. For a subterranean formation to produce liquid hydrocarbon, it should have a permeability of at least 100 md, to produce gas hydrocarbon the permeability can be lower.

A determination of formation permeability can be obtained by taking a core sample. However coring techniques have some drawbacks, such as time, expense, and inaccuracies due to sample errors and limited sample amounts. Other techniques for evaluating permeability include formation testing tools that actually penetrate the wellbore wall and draw connate formation fluid into the tool. The actual fluid as well as the amount of fluid flowing into the tool can be evaluated in order to make permeability determinations. Formation testing tools however are subject to inherent errors, such as pressure differentials between the formation and the tool that allow portions of the connate fluid to vaporize, thereby altering the fluid composition. When the original connate fluid is allowed to change phase, a determination of porosity is made more difficult. Additionally, since the tool must pierce the borehole wall, mudcake present in that wall can lodge itself in the probe tip thereby precluding the taking of a representative sample of connate fluid.

BRIEF SUMMARY OF THE INVENTION

The present disclosure includes a method of evaluating a characteristic of a subterranean formation, where the formation characteristic includes permeability as well as hydrocarbon and/or water content. The method includes transmitting an acoustic signal into the formation, evaluating the response of the acoustic signal, emitting an electro-magnetic signal into the formation, measuring the response of the electro-magnetic signal, and assessing the fluid composition of the formation based on the measured response. The acoustic signal can comprise a Stoneley wave. The acoustic signal can also be a Raleigh wave, a compressional wave, a shear wave, and combinations thereof. The analysis of the acoustic signal response provides information relating to the permeability of the formation. The step of assessing the fluid composition comprises determining the amount of water residing in the formation and determining the amount of hydrocarbon residing in the formation.

Also included within the scope of this disclosure is a downhole tool, the tool may comprise an acoustic transmitter, an acoustic receiver, a voltage potential measurement device, and an electro-magnetic source. The voltage potential measurement device of this tool can measure the axial potential difference along the tool due to electro-acoustic effects of a permeable media. The acoustic transmitter may emit Stoneley waves. The electro-magnetic source may create a magnetic field tangential to the direction of the electro-acoustic current. The voltage potential measurement device may comprise electrodes on the downhole tool, the electrodes may involve rings coaxially disposed on the outer surface of the downhole tool. Optionally, the electro-magnetic source may be a magnet.

DETAILED DESCRIPTION OF THE INVENTION

Figure 1:
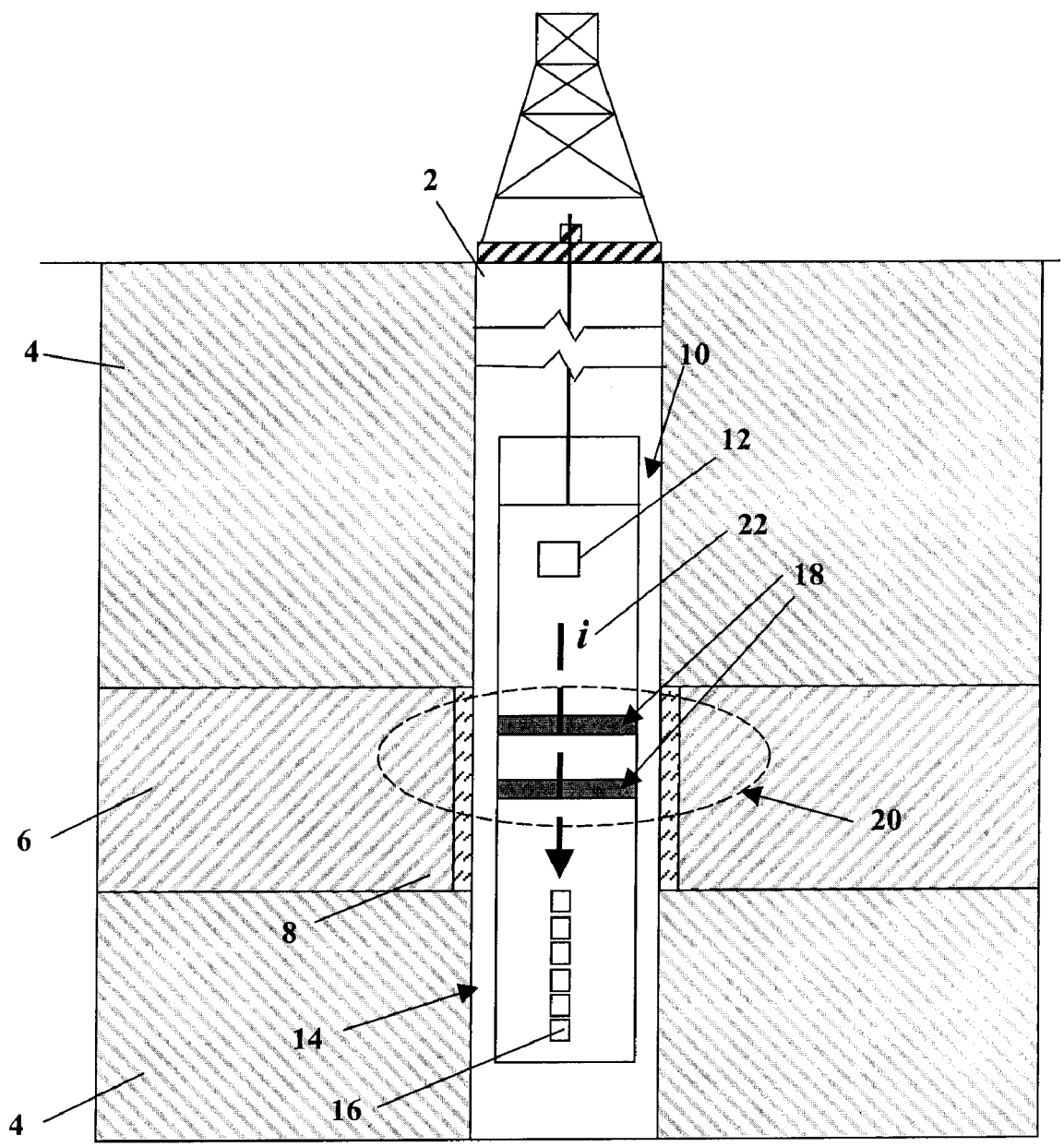
FIG. 1 illustrates an embodiment of a downhole tool disposed within a wellbore.

With reference now to FIG. 1, one example of a downhole tool 10 in accordance with the present disclosure is shown. In the embodiment of FIG. 1, the tool 10 comprises a transmitter 12, a receiver array 14, electrodes 18, and an electro-magnetic source 22. The transmitter 12 should be capable of producing acoustic waves, wherein the waves are transmissible into the formation surrounding the borehole 2. The acoustic waves generated by the transmitter 12 include Stoneley waves, compression waves (P type), shear waves (including shear horizontal SH and shear vertical SV). The receiver array 14 should be configured to receive the corresponding the wave signal. As shown, the transmitter 12 is a single point source disposed above the array 14, and the receiver array 14 comprises a series of individual receivers 16. However the transmitter 12 may comprise more than one source (i.e. multiple transmitters) and the receiver array 14 could be comprised of a single receiver 16. Additionally, the transmitter 12 can be disposed beneath the receiver array 14, or an additional array may be included wherein the transmitter 12 resides between the arrays. Moreover, different phasing arrangements of the receiver array 14 are possible, where the individual receivers 16 are phased at varying locations around the circumference of the tool 10.

The electro-magnetic source 22 can comprise a conductor capable of producing a large pulse current along the axis of the tool. The pulse current can create a strong magnetic field in a direction tangential to the axis of the tool and, as will be described in more detail below, perpendicular to electro-acoustic current flowing within the formation. Alternatively, the electro-magnetic source 22 can comprise a permanent magnet. The electro-magnetic source 22 as shown in FIG. 1 is disposed within the body of the downhole tool 10, however other arrangements are possible as well, such as on the outer surface of the tool 10. Although depicted between the transmitter and receivers, the electro-magnetic source 22 on either side of the electrodes as well as the transmitters or receivers.

Formation permeability and the possible presence of hydrocarbon and/or water in a reservoir can be determined by analyzing a formation with a combination of an acoustic signal and an electro-magnetic impulse. In situations when the formation contains a conductive fluid (i.e. a fluid containing an electrolyte), applying an acoustic signal to a rock matrix within the formation can produce relative motion of the conductive fluid within the rock matrix. A Stoneley wave is one such example of an appropriate acoustic signal. This relative motion, in turn, creates an electrical current due to electro-chemical effects taking place at the surface of the boundary between the matrix and electrolyte. A seismic signal or wave traveling through the fluid saturated rock matrix creates a resulting electrical field because the pore fluid within the matrix carries an excess electrical charge. The excess electrical charge is stored within the fluid because of ions absorbed by minerals in the matrix have a particular polarity. The absorption of these polarized ions in the matrix results in ions of an opposite polarity having a dominant presence in the fluid, thereby resulting in a charged solution. Thus if a resulting pressure gradient, such as that produced by a seismic signal, urges the solution through the rock matrix the fluid movement along the pore surface moves the particularly charged ions thereby creating a streaming electrical current. The streaming electrical current in turn induces an electrical field in the formation.

Stoneley (sometimes call "tube") waves are high-amplitude guided waves generated by a radial flexing of the borehole as the acoustic energy passes from the borehole fluid into the rock formation. They propagate at low frequencies along the fluid/rock interface at the borehole wall. Stoneley waves are notable for several special properties: there is no cut-off frequency; dispersion is very mild; for all frequencies, Stoneley-wave velocity is less than fluid velocity; group velocity nearly equals phase velocity over the frequency range. The Stoneley wave has maximum amplitude at the wall of the borehole, and decays radially away from the wall. At low frequencies Stoneley-wave velocity is calculated as follows:

$$VST = [\rho(1/K + 1/G)]^{1/2}$$

where $\rho$, K, and G are defined as:
K=bulk modulus of elasticity
G=shear modulus of elasticity
$\rho$=density of medium The energy/amplitude of acoustic waves is attenuated or dispersed primarily by travel through the borehole fluid and rock matrix. Additional attenuation is usually caused by the following factors: particle friction, changes in acoustic impedance (the product of density ($\rho$) and acoustic velocity (v)) at interfaces between different mediums, borehole rugosity, mudcake rigidity and signal reduction due to tool eccentricity. The radial flexing of the borehole caused by the Stoneley wave creates an extended zone of the borehole just adjacent a compressed region. Fluid within the rock matrix flows from the formation adjacent the compressed region to the extended region. A net charge differential is then created between the compressed and extended regions. The actual charge (i.e. positive or negative) of each region is dependent on the charge of the pore fluid. For example, if the pore fluid has a positive charge, then the region proximate to the extended region will have a generally positive charge due to fluid migration caused by the seismic signal. An indication of a permeable formation exists when the depth dependence of travel time delay corresponds to the centroid frequency shift.

In one example of use of the device of FIG. 1, the downhole tool 10 is disposed within a wellbore 5 for investigating the wellbore 2 and the formations adjacent the wellbore 2. One example of such an investigation comprises activating the transmitter 12 thereby creating an acoustic signal that is then transmitted into the formation adjacent the wellbore 2. The resulting signal, wherein at least a portion of which has passed through the formation, can then be received and recorded by the receiver array 14. While disposed in the wellbore 2, the electro-magnetic source 22 is activated to project a magnetic field 20 into the formation surrounding the borehole 2. Alternatively, a strong permanent magnet can be used. Preferably the magnetic field 20 is directed substantially perpendicular to the flow of the streaming current. However other orientations of the magnetic field 20 can yield useful results. It is believed that those skilled in the art can ascertain these other orientations without undue experimentation. During the acoustic sampling of the borehole 2, an investigation of electrical potential can be conducted as well. One example of electrical sampling using the device of FIG. 1 involves measuring the electrical potential that exists between the electrodes 18. While the electrodes 18 of FIG. 1 are shown as ring electrodes, they can take on any form capable of measuring an electrical potential along the downhole tool 10, either axially or radially. Also, when using the tool 10, readings can occur continuously while lowering or raising the tool 10, or at discrete locations within the wellbore 2. The pulse current source can be initiated as soon as the tool 10 is disposed in the wellbore 2, or when desired to take measurements in the wellbore 2.

Figure 2:
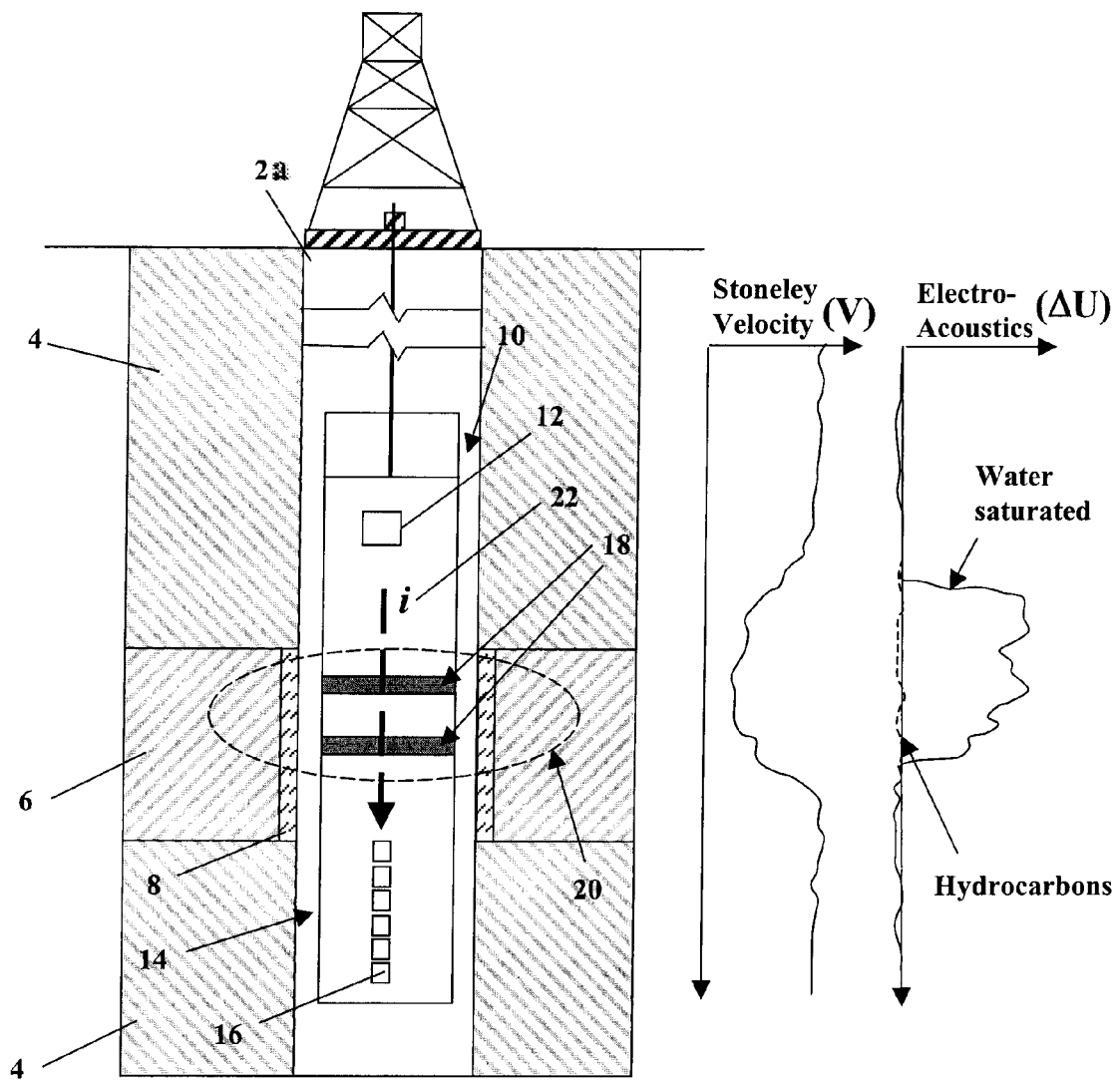
FIG. 2 shows a downhole tool along with examples of measured responses of the tool.

FIG. 2 demonstrates a situation where the acoustic signal emitted by the transmitter 12 is a Stoneley wave. In this figure an example borehole 2a is provided along with example subterranean formations adjacent to the borehole 2a, e.g. non-permeable formation 4, permeable formation 6, and mud cake 8. FIG. 2 also includes examples of measured responses aligned to correspond with the different formations of the borehole 2a. Thus one of the advantages of employing embodiments of the device and method herein disclosed is to identify types of formations within the borehole 2a by analyzing the measured responses individually and in combination. The measured responses include: (1) a measured velocity of a Stoneley wave in the example borehole 2a, and (2) electrical potential measured by the electrodes 18 in the example borehole 2a. Based on a study of these responses, a potential hydrocarbon producing zone can be identified by using the tool of FIG. 1. For example, as shown in FIG. 2, a decrease in the measured velocity of the Stoneley wave is shown corresponding to the region of the permeable formation 6 encountered by the downhole tool 10. The measured response of electro-acoustic voltage similarly responds to the presence of the permeable zone 6 with an increase for water saturated and a stable value thereby indicating a hydrocarbon presence.

The electrical current effect will be measurably conspicuous in the case of a (conductive) water-saturated formation, conversely it will be substantially inconspicuous if the formation is 100% oil-saturated. Partial presence of an electrolyte (conductive water) in the permeable media will reduce this effect due to blocking effects of the oil on a portion of the boundary surface between the electrolyte and the rock matrix. As discussed below, a measurement of the electrical current produced in the formation by the relative motion, can indicate hydrocarbon/water ratios present in the formation. Measuring the electro-acoustic current in this case could allow an indicative estimation of the partial oil content in this mixture.

Conducting these measurements while drilling could significantly reduce negative effects of the mud cake/invaded zone on the interpretation of these measurements. Presence of these additional factors can be taken into account by including a model of the mud cake/invasion zone formation into the electro-acoustic model.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the device is not limited to being wireline conveyed, but can be suspended by any known means, such as tubing, coiled tubing, or slickline as well as any later developed means. Additionally, the device and method can be used in conjunction with downhole drilling or other boring operations. These and other similar modifications will readily suggest themselves to those skilled in the art, and are intended to be encompassed within the spirit of the present invention disclosed herein and the scope of the appended claims.

What is claimed is:

1. A method of evaluating a borehole comprising:
   emitting a Stoneley wave within the borehole;
   monitoring the emitted Stoneley wave and measuring a wave velocity of the Stoneley wave;
   measuring electrical current produced in the formation by relative motion induced by the Stoneley wave;
   identifying a permeable zone in the formation adjacent the wellbore where there is a decrease in the measured wave velocity and an increase in the measured electrical current; and
   estimating the partial oil content in the permeable zone of the formation based on the measured electrical current.

2. The method of claim 1, further comprising estimating the fluid composition of the formation based on the measured electrical current.

3. The method of claim 1 further comprising emitting an acoustic signal within the wellbore, wherein the acoustic signal is selected from a list consisting of a Raleigh wave, a compressional wave, a shear wave, and combinations thereof.

4. The method of claim 1 further comprising determining the amount of water residing in the formation based on the measured electrical current.

5. The method of claim 2 further comprising determining the amount of hydrocarbon residing in the formation based on the measured electrical current.

6. The method of claim 1 wherein the acoustic signal motivates fluid within the formation, wherein the fluid motivated contains electrolytes.

7. The method of claim 6 wherein movement of the electrolytically containing fluid creates an electrical current within the formation.

8. The method of claim 7 further comprising estimating the water content of the formation based on the measure of the electrical current.

9. The method of claim 7 further comprising estimating the hydrocarbon content of the formation based on the measure of the electrical current.

10. The method of claim 1 further comprising, emitting an electro-magnetic signal within the borehole and measuring the electro-magnetic signal within the borehole, wherein the step of estimating the partial oil content in a permeable zone is also based on the measured electro-magnetic signal.

11. A method of investigating a subterranean formation comprising:
   (a) transmitting an acoustic signal into the formation that creates an electrical current in the formation;
   (b) measuring a velocity of the acoustic signal of step (a);
   (c) measuring an electrical potential difference between two locations in the formation produced by the electrical current; and
   (d) identifying a permeable zone within the formation where the acoustic signal velocity decreases and the measured electrical potential of step (c) increases; and
   (e) estimating a hydrocarbon/water ratio in the fluid present in the formation based on the measurement of electrical potential in step (c) and the measurement of electro-magnetic signal in step (d).

* * * * *